United States Patent
Park et al.

(10) Patent No.: US 6,578,862 B2
(45) Date of Patent: Jun. 17, 2003

(54) AUTOMOTIVE STEERING RACK-STROKE ADJUSTING DEVICE

(75) Inventors: Soo-Bo Park, Suwon (KR); Un-Koo Lee, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/747,981

(22) Filed: Dec. 27, 2000

(65) Prior Publication Data
US 2002/0026843 A1 Mar. 7, 2002

(30) Foreign Application Priority Data
Aug. 21, 2000 (KR) ........................................ 2000-48284

(51) Int. Cl.⁷ .................................................. B62D 5/04
(52) U.S. Cl. .................... 280/444; 280/428; 74/388 PS
(58) Field of Search ................................ 180/428, 444; 74/89.18, 411.5, 388 PS

(56) References Cited

U.S. PATENT DOCUMENTS

| | | | | |
|---|---|---|---|---|
| 4,893,038 A | * | 1/1990 | Miyzawa | 310/83 |
| 6,164,150 A | * | 12/2000 | Shindo et al. | 74/388 PS |
| 6,227,064 B1 | * | 5/2001 | Nakamura | 74/388 PS |
| 6,244,125 B1 | * | 6/2001 | Sano | 74/388 PS |

* cited by examiner

Primary Examiner—Lesley D. Morris
Assistant Examiner—L. Lum
(74) Attorney, Agent, or Firm—Birch, Stewart, Kolasch & Birch, LLP

(57) ABSTRACT

An automotive steering rack-stroke adjusting device with which a driver can conveniently control the length of a steering rack-stroke as needed for changing a minimum turning radius, the device including: a rotational body rotatively arranged at both ends of a power cylinder of a steering system; a stop plate fixed at a rack for inserting or overlapping to the center of the rotational body according to the rotational state of the rotational body when the rack is pulled to the power cylinder to the maximum extent; and an actuator for rotating the rotational body forwards or backwards under the control of a control unit which is manipulated by a driver with an operational switch.

12 Claims, 6 Drawing Sheets

AUTOMOTIVE STEERING RACK-STROKE ADJUSTING DEVICE

BACKGROUND OF THE INVENTION

1. Field of the Invention

The present invention relates to an automotive steering rack-stroke adjusting device and more particularly to an automotive steering rack-stroke adjusting device with which a driver can conveniently control the range of a steering rack-stroke as required for changing a minimum rotation radius, thereby providing convenience for the driver.

2. Description of the Prior Art

In driving an auto vehicle, a driver makes frequent U turns. In case of a vehicle with a large minimum rotation radius, a U turn cannot be completed by one trial, but with several adjustments, which brings about inconvenience and disruption in driving, an aggravating a problem during traffic congestion.

Recently, there has been introduced a model of a large passenger vehicle with an entire length of over 5000 mm in addition to large-scale cargo trucks or family vans, thereby worsening the aforementioned problem of making a U turn.

In addition, the problem as such gets more serious with any vehicles with front engine and front wheel drives because the engine is horizontally positioned to occupy a large space of the engine room, so that it gets difficult to accommodate a steering space for setting up a steering angle of the front wheel.

Furthermore, according to a conventional method for setting up a rack-stroke of a steering gear box for steering operations, the rack-stroke is set up to maintain a gap from side members of a body and the related parts to the minimum assumed that a maximum cross-sectional size of a tire is measured under a worst driving condition where a snow chain is wound at a front wheel (driving wheel).

However, there is a problem in that if the rack-stroke of a steering gear box is set up as described above, a rotation size of a wheel is made with an overall surface including a largest tire utilized or a snow chain mounted to a regular tire, such that in case of using only a regular tire or a tire without a snow chain to the regular tire, the gap to an actually interfering object point gets bigger.

There is another problem in that the aforementioned problem occurs when a U turn is made in the course of a regular driving at a low speed in a city, and in most cases, although a steering handle can be allowed to make a further wider turn, the rack-stroke is set up at its worst condition.

Particularly, although the minimum rotation radius is a factor to significantly affect the quality of a product like large passenger cars or any other front driving vehicles, the rack-stroke of steering gear box is still inefficiently constructed as described above.

SUMMARY OF THE INVENTION

Therefore, the present invention is disclosed to solve the aforementioned problem and it is an object of the present invention to provide an automotive steering rack-stroke adjusting device with which a driver can conveniently control the range of a steering rack-stroke as required for changing a minimum rotation radius, thereby providing convenience for the driver.

In order to accomplish the aforementioned object of the present invention, there is provided an automotive steering rack-stroke adjusting device comprising:

a rotational body rotatably arranged at both ends of a power cylinder of a steering system;

a stop plate fixed at a rack for inserting or overlapping to the center of the rotational body according to the rotational state of the rotational body when a rack is pulled toward the power cylinder to a maximum extent; and an actuator for rotating the rotational body back and forth under the control of a control unit is manipulated by a driver with an operational switch, the operational switch being operable independently of a steering wheel of the steering system.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, preferred embodiments of the present invention will be described in detail with accompanying drawings.

Figure 1:
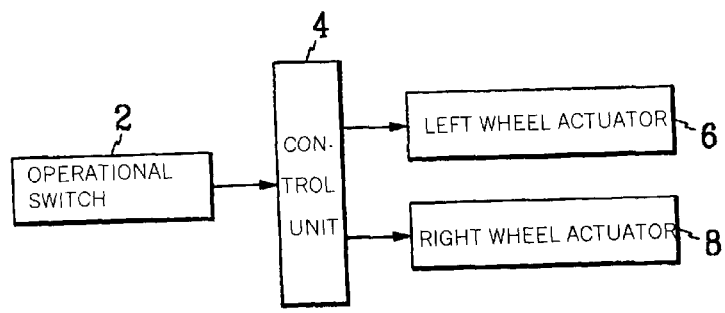
FIG. 1 is a block diagram of an automotive steering rack-stroke adjusting device of the present invention.

FIG. 1 is a block diagram of a steering system in accordance with the present invention, and reference numeral 2 indicates an operational switch.

The operational switch 2 is arranged near a driver's seat. When a driver manipulates the operational switch 2 as needed, a control unit 4 recognizes it to thereby adjust rack-stroke by controlling left and right actuators 6,8, in other words, driving means arranged at a predetermined position of a steering gear box.

Figure 2:
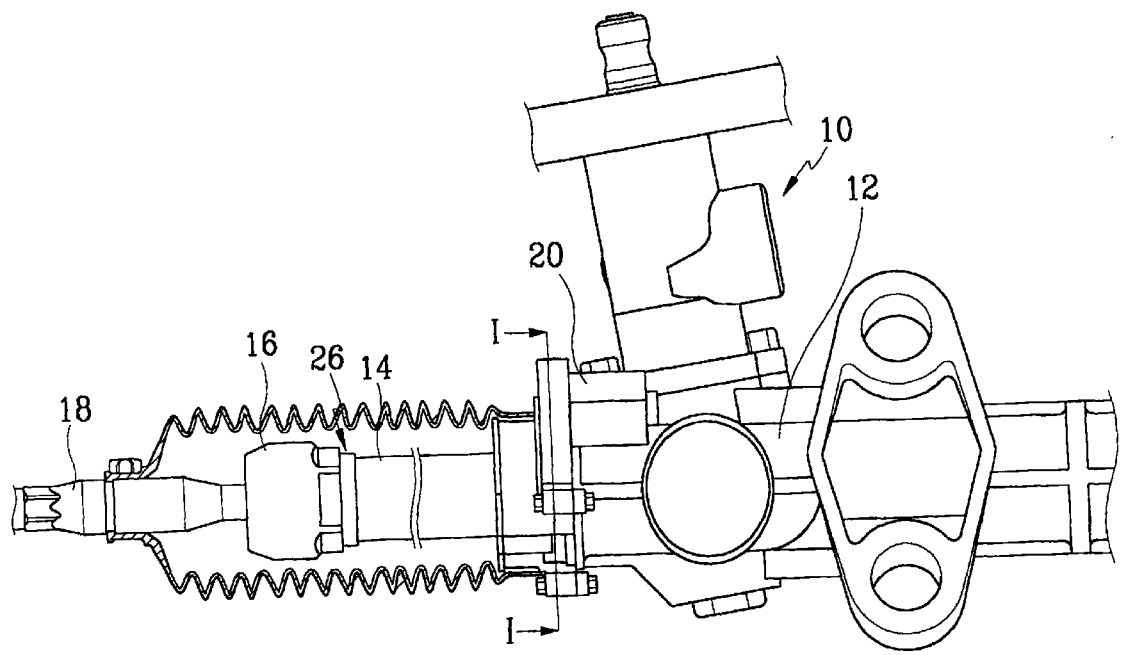
FIG. 2 is a partial perspective view of a steering gear box for illustrating a part to which the present invention is applied.

As described above, the left and right actuators 6,8, driving means to be operated with an electrical signal of the control unit 4, as shown in FIG. 2, are to control rack-stroke adjusting means arranged at left and right sides of a steering gear box 10. At this time, the left and right rack-stroke adjusting means are integrally constructed, so that only one of the adjusting means is illustrated in the drawing of the present invention as shown in FIG. 2.

In addition, if a steering handle (not shown) is rotated in a steering direction, the steering system using rack and pinion of the present invention conveys the rotational motion to the steering gear box 10 via a steering shaft. In the steering box 10, a rack 14 installed in a power cylinder 12 is moved to the left or right by a rack and pinion method to steer a wheel via a tie-rod 18 connected with an insertion of a ball joint 16 at a free end of the rack 14, thereby accomplishing the steering operation of a vehicle.

In accordance with the present invention, a first embodiment of a rack-stroke adjusting means applicable to the steering system as such comprises: a driving motor 20, that is, an actuator, a rotational body 22 to be driven by the driving motor 20 and a stop plate 26 to selectively pass through a throughhole 24 formed at the center of the rotational body 22.

At this time, the driving motor 20 is embedded with a circuit breaker to automatically stop its operations when the motor is excessively loaded in its operation.

Furthermore, the rotational body 22 is made of a circular plate with a gear part 28 being formed at its external circumference. At this time, the gear part 28 is formed at any part of the external circumference of the rotational body 22, but it may also be formed within the range of a rotation to be drawn by the rotational body 22.

Also, a throughhole 24 is formed at the center of the rotational body 22, and the throughhole 24 is formed with curved surfaces 30 at the center, and with two sector grooves 32 connecting the curved surfaces 30 and a protruder 36 on a side of the rotational body.

The sector type grooves 32 define an internal angle ($\alpha$) of 90 degrees, which means that the rotational body 22 is set to be controlled to rotate forwards or backwards by 90 degrees. It is not necessary to restrict the internal angle of the sector type grooves 32 to 90 degrees, so that a slight variation from 90 degrees is achievable. In case of variations of the internal angle ($\alpha$), the rotational angle of the rotational body 22 should be adjusted according to its varied internal angle.

Additionally, a stop protruder 36 is formed at one side of the two sector type grooves 32 for limiting the range of moving the rack 14.

Also, the stop plate 26 selectively passing through the throughhole 24 includes diametrically opposed protruders 42 which correspond to the sector grooves 32.

Figure 3:
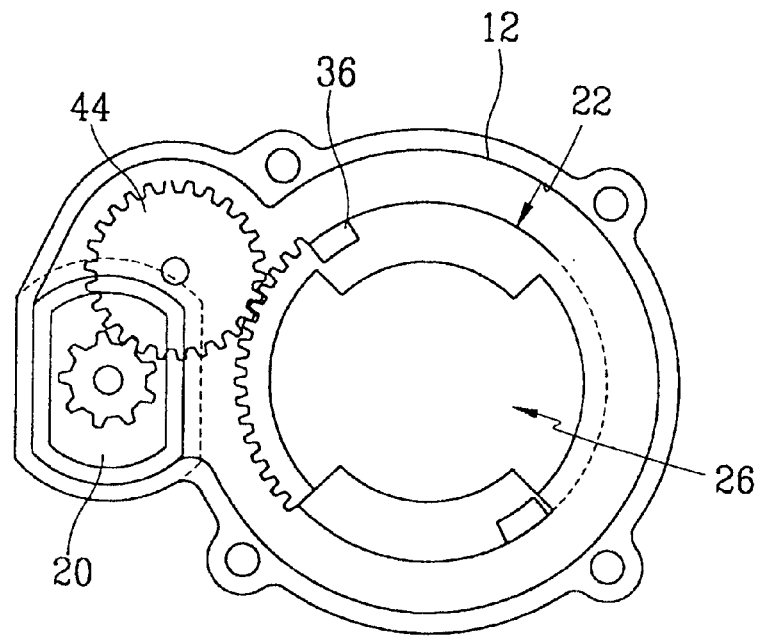
FIG. 3 is a cross-sectional view taken along line I—I shown in FIG. 2 for illustrating the structure of the first embodiment in accordance with the present invention.
Figure 4:
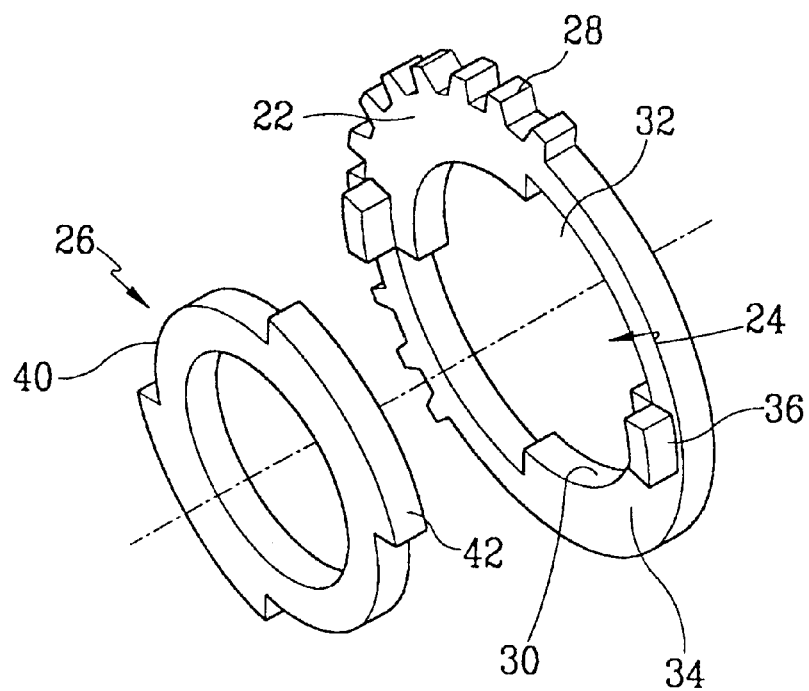
FIG. 4 is an analytical perspective partial view of an important part for illustrating the first embodiment of the present invention.

The parts constructed as such are arranged to allow the rotational body 22 to rotate within the power cylinder 12 as shown in FIG. 3.

As further shown in FIG. 3, the driving motor 20 drives the rotational body 22 when it is fixed within the power cylinder 12 with an insertion of an idling gear 44, and the stop plate 26 is fixed at an internal side of a ball joint 16 around the rack 14, allowing the sector protruders 42 to be inserted into the sector grooves 32 of the rotational body 32 before its operations.

Figure 5A:
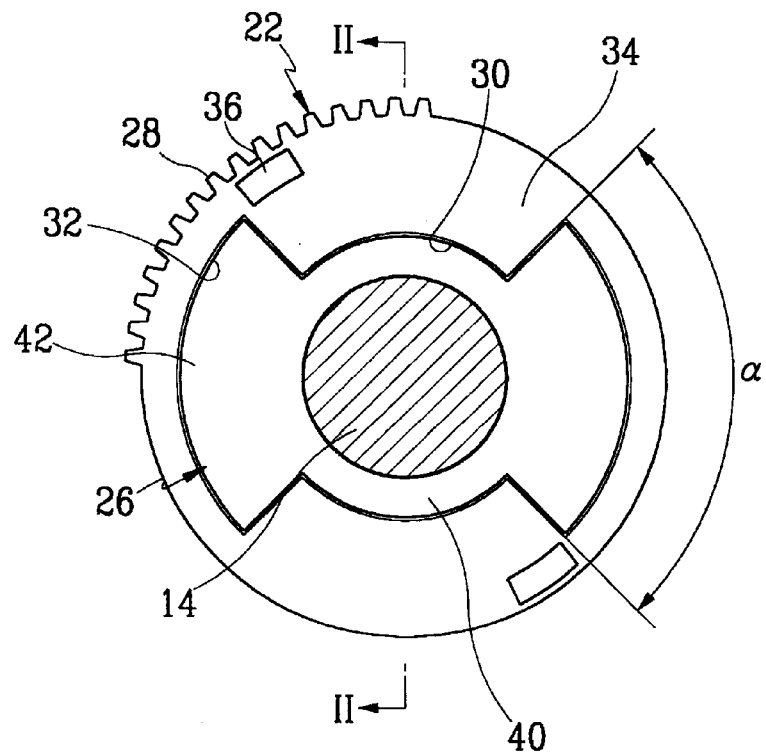
FIG. 5a is a front view for illustrating a state of a steering rack-stroke adjusting device prior to operation of the first embodiment in accordance with the present invention.
Figure 5B:
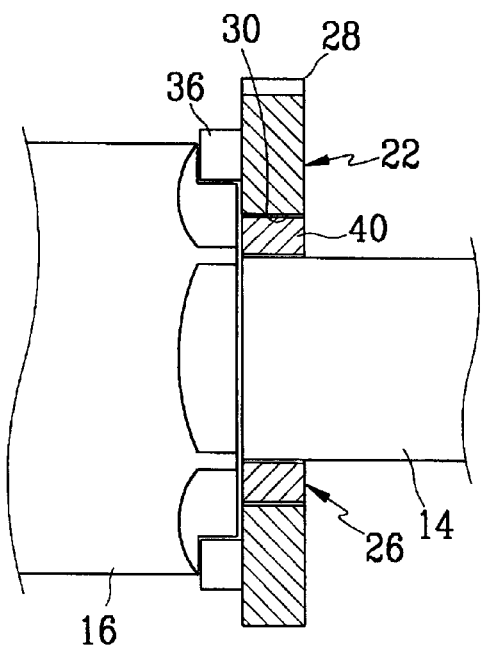
FIG. 5b is a cross-sectional view taken along line II—II for illustrating a state of a steering rack-stroke adjusting device prior to operation of the first embodiment in accordance with the present invention.

According to the first embodiment of the present invention as described above, in case of the regular driving state where the stroke of the rack 14 is controlled at its maximum extent, as shown in FIG. 5, the sector type grooves 32 and protruders 42 of the rotational body 22 are positioned at an identical level of a line. If rack 14 is pulled toward the power cylinder 12 to the maximum extent according to its steering operation, the sector type of protruders 42 are inserted to the sector type grooves 32, to thereby maximize the level of its steering operation.

Accordingly, it becomes possible to increase the minimum rotational radius to the maximum extent in the regular driving status, thereby being very advantageous in the driving condition of maintaining the minimum rotational radius.

However, in case of reducing a stroke of the rack 14 by winding a chain onto a wheel, a driver can manipulate the operational switch 2 arranged at the driver's seat to control the left and right actuators 6, 8 of the control unit 4.

Figure 6A:
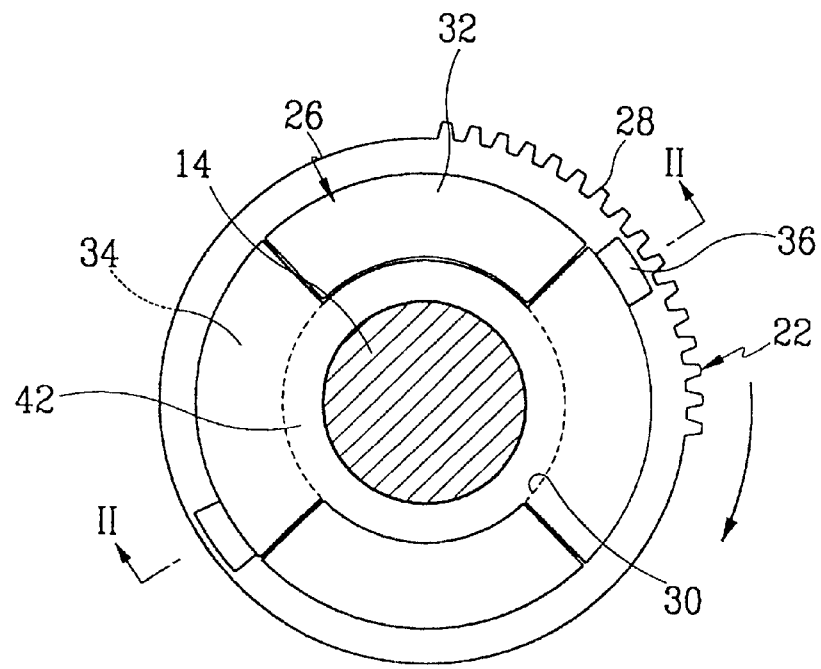
FIG. 6a is a front view for illustrating a state of a steering rack-stroke adjusting device after operation of the first embodiment in accordance with the present invention.

In other words, when power is supplied to the driving motor 20 relevant to the left and right actuators 6,8 from the control unit 4 to rotate the rotational body 22 to a predetermined angle (approximately 90 degrees), thereby resulting in the state illustrated in FIG. 6a.

Figure 6B:
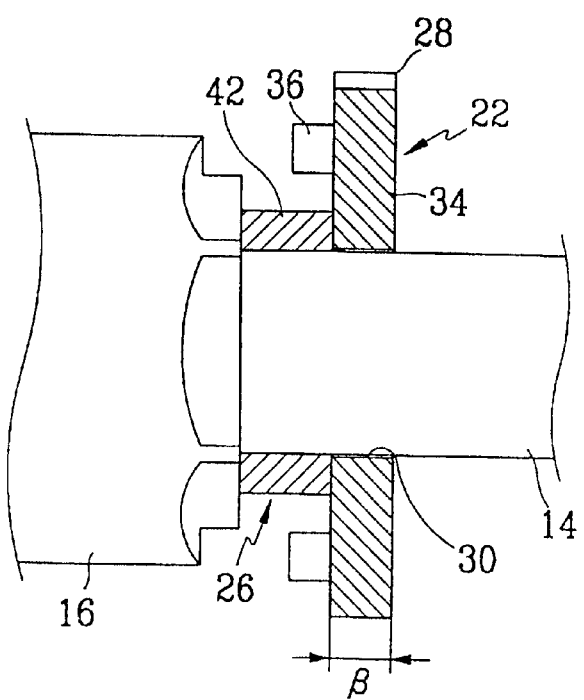
FIG. 6b is a cross-sectional view taken along line III—III for illustrating a state of a steering rack-stroke adjusting device after operation of the first embodiment in accordance with the present invention.

Then, the sector protruders 42 of the stop plate 26, and the protruders 36 of the rotational body 22 are positioned at an identical level. When the rack 14 is pulled to its maximum level according to a steering operation, the sector protruders 42 contact the protruders 36 as shown in FIG. 6b, thereby restricting movement of the rack 14.

Likewise, if the rack 14 is restricted to reduce its movement by the thickness ($\beta$) of the rotational body 22 in comparison with its normal state, the steering angle gets as small as the reduction in movement of the rack 14.

In other words, the reduction of a steering angle means that it is possible to prevent a chain wound around a wheel from making any damage to the body in contact.

Figure 7:
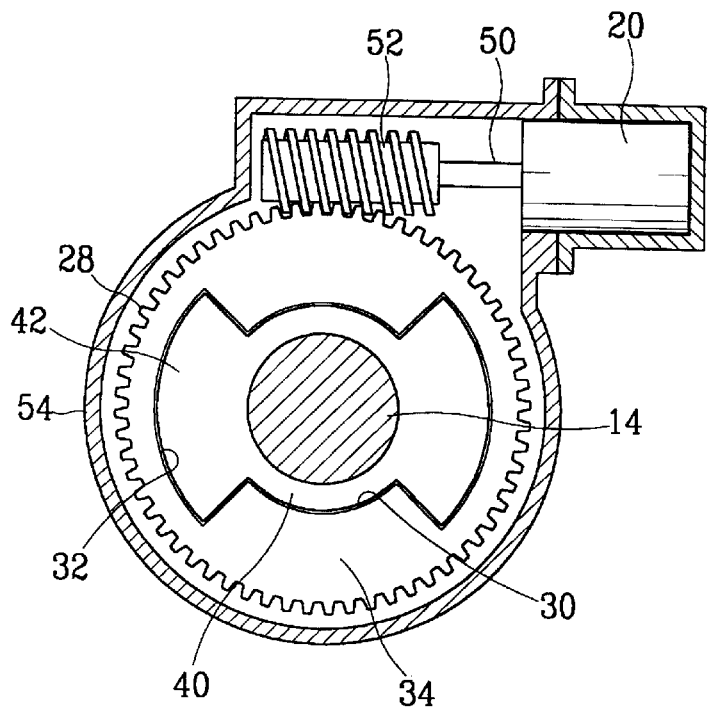
FIG. 7 illustrates a steering rack-stroke adjusting device in accordance with a second embodiment of the present invention.

FIG. 7 illustrates a second embodiment of the present invention. In the first embodiment described above, the gear part 28 at the external circumference of the rotational body 22 is constructed in a spur gear arrangement with insertion of the idling gear 44 to be driven by the driving motor 20. In contrast, a circular drive motor 20 rotates a worm gear arrangement in the second embodiment of the present invention.

In other words, a worm 52 is mounted at an end of a motor shaft 50, and a worm gear 54 is formed at an external circumference of the rotational body 22. At this time, even the second embodiment has a difference in its driving method from the first embodiment, its operations and effects are the same as those of the first embodiment, so as to omit detailed descriptions.

Figure 8:
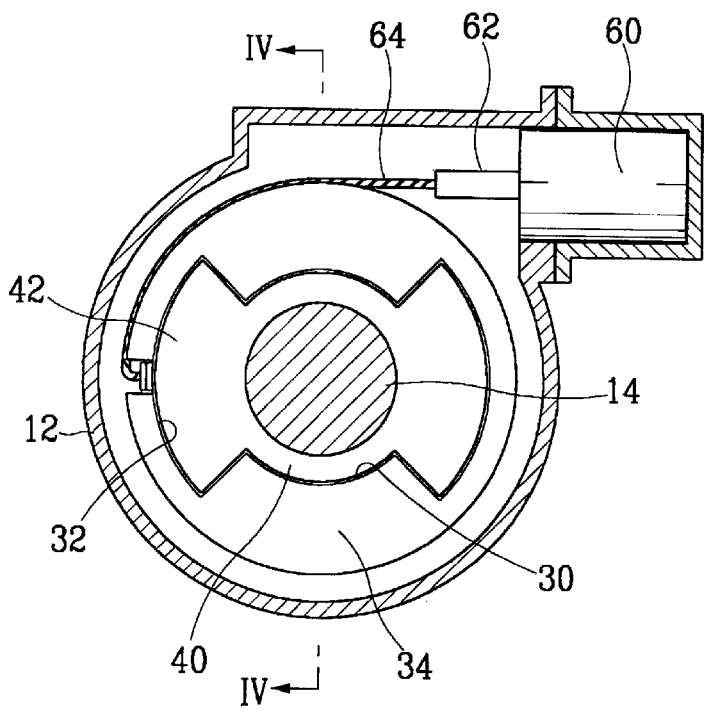
FIG. 8 illustrates a steering rack-stroke adjusting device in accordance with a third embodiment of the present invention.
Figure 9:
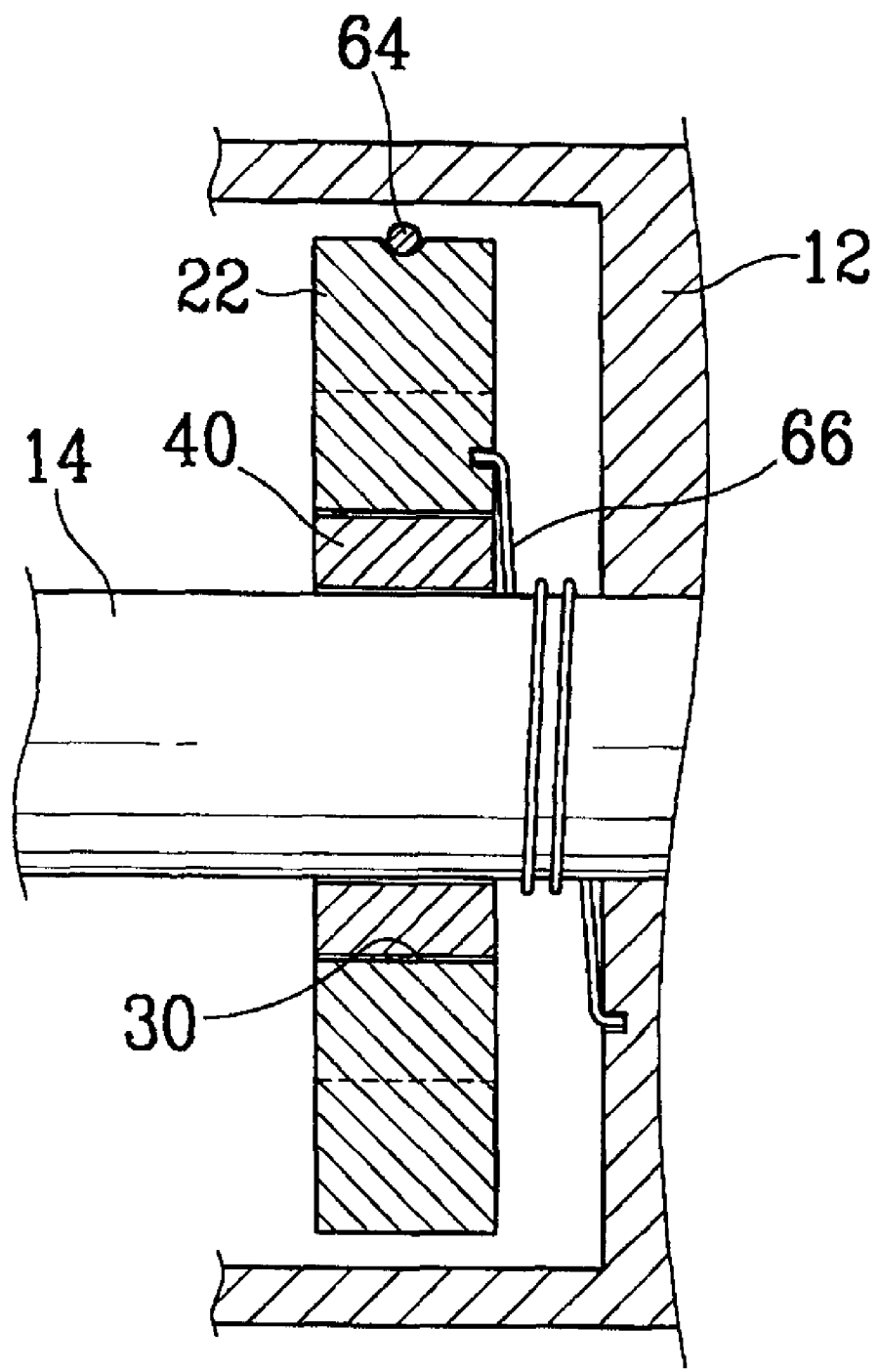
FIG. 9 is a cross-sectional view taken along line IV—IV shown in FIG. 8.

FIG. 8 and FIG. 9 illustrate a third embodiment of the present invention using a solenoid 60, differently from the second and third embodiments motors using rotating drive.

In other words, a cable 64 is connected at an end of an operating rod 62 of the solenoid 60, which is further connected with the rotational body 22. When power is supplied to the solenoid 60, the operational rod 62 and the cable 64 are sequentially pulled to rotate the rotational body 22.

In contrast, when power is shut off to the solenoid 60, the operational rod 62 returns by a return spring embedded at the solenoid 60 to thereby return the rotational body 22.

Also, the cable 64 is made of a kind of elastic material to be wound around the external circumference of the rotational body 22, preventing the rotational body 22 from returning by recovery of the pulled cable 64.

In addition, in FIG. 9 an elastic member 66 is included between the rotational body 22 and the power cylinder 12. The arrangement of the elastic member 66 as such can make sure of the recovery of cable 64.

As described above, there is an advantage in the present invention in that the dimension of stroke of a steering rack can be conveniently controlled as needed for changing its minimum rotation radius, thereby minimizing its minimum rotation radius and providing convenience in driving.

Additionally, the present invention is advantageous in solving a problem of contacting a tire chain with the body by a reduction in range of a stroke of the rack when the chain is wound around the wheel on snowy days, thereby improving the quality of vehicle steering.

Furthermore, the present invention is also advantageous in securing the minimum rotation radius according to the driving conditions to improve convenience of parking the vehicle, driving it at low speeds, making a U turn, or driving on a narrow road, and in securing the cross-sectional surfaces of side members and lower arms to reinforce strength and improve endurance to collision or impact and NVH.

What is claimed is:

1. An automotive steering rack-stroke adjusting device comprising:
   a rotational body rotatably arranged at both ends of a reciprocable power cylinder coupled to a steering rack of a steering system;
   a stop plate fixed with respect to the steering rack for inserting into or overlapping a center of the rotational body according to the rotational state of the rotational body when the steering rack moves longitudinally toward the power cylinder to a maximum extent; and
   an actuator for rotating the rotational body back and forth under control of a control unit which is manipulated by a driver with an operational switch, the operational switch being operated independently of a steering wheel of the steering system.

2. The device, as defined in claim 1, wherein the rotational body is a ring-shaped plate comprising
   A gear portion formed at an external circumference,
   Two diametrically opposed sector grooves in an internal circumference, and
   A stop formed on one side of the plate adjacent each sector groove for restricting movement of the rack.

3. The device, as defined in claim 1, wherein the actuator includes a drive motor to be meshed with the rotational body with insertion of an idling gear.

4. The device, as defined in claim 1, wherein the actuator includes a drive motor to be meshed with the rotational body by a worm gear.

5. The device, as defined in claim 1, wherein the actuator includes a solenoid to be in connection with the rotational body via a cable connected to an end of an operational rod thereof.

6. An automotive steering rack-stroke adjusting device for a steering rack arranged at both ends of a reciprocal power cylinder, the device comprising
   A rotational body formed of a ring-shaped plate having
      A gear portion formed on an external circumference,
      Two diametrically opposed sector grooves in an internal circumference, and,
      A stop formed at one side of the plate adjacent each sector groove for restricting longitudinal movement of the steering rack,
   A stop plate formed of a ring-shaped plate having two protruders on an external circumference, the protruders corresponding to the sector grooves, and,
   A drive motor connected with the gear portion by an idling gear.

7. An automotive steering rack-stroke adjusting device for a steering rack arranged at both ends of a reciprocable power cylinder comprising
   A rotational body formed of a ring-shaped plate having
      A gear portion formed on an external circumference,
      Two diametrically opposed sector grooves in an internal circumference, and,
      A stop formed at one side of the plate adjacent each sector groove for restricting longitudinal movement of the steering rack,
   A stop plate formed of a ring-shaped plate having two protruders on an external circumference, the protruders corresponding to the sector grooves, and,
   A drive motor connected with the rotational body by a worm gear arrangement.

8. An automotive steering rack-stroke adjusting device for a steering rack arranged at both ends of a reciprocable power cylinder, the device comprising
   A rotational body formed of a ring-shaped plate having
      A gear portion formed on an external circumference,
      Two diametrically opposed sector grooves in an internal circumference, and,
      A stop formed on one side of the plate adjacent each sector groove for restricting longitudinal movement of the steering rack,
   A stop plate formed of a ring-shaped plate having two protruders on an external circumference, the protruders corresponding to the sector grooves, and,
   A solenoid connected with the rotational body by a cable for rotating the rotational body forwards and backwards.

9. A stroke length adjustment device for steering racks connected to left and right front wheels of a vehicle comprising:
   a reciprocable power cylinder for moving each steering rack longitudinally of a front axle of the vehicle to adjust a turning radius of the vehicle, each steering rack being movable between an inner position and an outer position by operation of the power cylinder;

a retainer mechanism for securing the steering rack in either the inner or outer position in response to a control signal; and a manually operable switch, independently operable from any steering movements of the vehicle, for generating said control signal to said retainer mechanism and enabling said power cylinder to move said steering rack longitudinally.

10. The device of claim 9 wherein said retainer mechanism comprises:

a rotatable plate having a throughhole for accommodating longitudinal movement of the steering rack between the respective inner and outer positions; and an actuator for rotating said rotatable plate between first and second secured positions about said steering rack corresponding to the inner and outer positions thereof, said actuator being responsive to control signals generated by the manually operable switch.

11. The device of claim 10 wherein said retainer mechanism further includes

A stop plate in form of a ring, the ring having diametrically opposed grooves in an external circumference, for selective engagement with said rotatable plate in the respective first and second postions thereof.

12. The device of claim 11 wherein the grooves conform within the throughhole of the rotatable plate when said steering rack is in said outer position.

* * * * *